US011853507B2

(12) United States Patent
Kida et al.

(10) Patent No.: US 11,853,507 B2
(45) Date of Patent: Dec. 26, 2023

(54) DISPLAY DEVICE WITH BUILT-IN TOUCH PANEL, AND METHOD FOR CONTROLLING DISPLAY DEVICE WITH BUILT-IN TOUCH PANEL

(71) Applicant: Sharp Display Technology Corporation, Kameyama (JP)

(72) Inventors: Kazutoshi Kida, Kameyama (JP); Yasuhiro Sugita, Kameyama (JP)

(73) Assignee: Sharp Display Technology Corporation, Kameyama (JP)

(*) Notice: Subject to any disclaimer, the term of this patent is extended or adjusted under 35 U.S.C. 154(b) by 0 days.

(21) Appl. No.: 17/685,876

(22) Filed: Mar. 3, 2022

(65) Prior Publication Data

US 2022/0283703 A1   Sep. 8, 2022

(30) Foreign Application Priority Data

Mar. 5, 2021   (JP) ................. 2021-035292

(51) Int. Cl.
*G06F 3/041* (2006.01)
*G06F 3/044* (2006.01)

(52) U.S. Cl.
CPC ...... *G06F 3/041662* (2019.05); *G06F 3/0412* (2013.01); *G06F 3/0443* (2019.05)

(58) Field of Classification Search
CPC ............. G06F 3/041662; G06F 3/0412; G06F 3/0443; G06F 3/04182; G06F 3/04184
See application file for complete search history.

(56) References Cited

U.S. PATENT DOCUMENTS

| 9,652,091 B1* | 5/2017 | Obeidat ............... G06F 3/0416 |
| 2012/0056835 A1 | 3/2012 | Choo et al. |
| 2016/0378225 A1* | 12/2016 | Wang .................... G06F 3/0446 345/174 |
| 2017/0213499 A1* | 7/2017 | Kong ..................... G11C 19/28 |
| 2018/0348931 A1* | 12/2018 | Kim ..................... G09G 3/3225 |
| 2020/0393926 A1* | 12/2020 | Kim ....................... G06F 3/0441 |
| 2021/0232285 A1* | 7/2021 | Feng .................. G06F 3/04166 |
| 2022/0206663 A1* | 6/2022 | Kim ..................... G09G 3/3655 |

FOREIGN PATENT DOCUMENTS

JP   2012-059265 A   3/2012

* cited by examiner

*Primary Examiner* — Md Saiful A Siddiqui
(74) *Attorney, Agent, or Firm* — ScienBiziP, P.C.

(57) ABSTRACT

A display device includes a plurality of drive electrodes, a plurality of detection electrodes, and a touch detection driver configured to supply a drive signal for self-capacitance detection to the plurality of detection electrodes and acquire a self-capacitance detection signal from the plurality of detection electrodes. The touch detection driver is configured to supply the drive signal for self-capacitance detection to at least one of the plurality of detection electrodes while the gate signal is being supplied to gate lines overlapping any one of the plurality of drive electrodes.

8 Claims, 11 Drawing Sheets

DISPLAY DEVICE WITH BUILT-IN TOUCH PANEL, AND METHOD FOR CONTROLLING DISPLAY DEVICE WITH BUILT-IN TOUCH PANEL

CROSS-REFERENCE TO RELATED APPLICATIONS

This application claims the benefit of priority to Japanese Patent Application Number 2021-035292 filed on Mar. 5, 2021. The entire contents of the above-identified application are hereby incorporated by reference.

BACKGROUND

Technical Field

The disclosure relates to a display device with a built-in touch panel, and a method for controlling a display device with a built-in touch panel.

There have been known display devices with a built-in touch panel that include a full-in cell type touch panel, and methods for controlling a display device with a built-in touch panel. Such a display device with a built-in touch panel and a method for controlling a display device with a built-in touch panel are disclosed in, for example, JP 2012-59265 A.

The display device with a built-in touch panel of JP 2012-59265 A described above is provided with a touch sensor array, a pixel array, a gate driver, a touch controller, and a timing controller. This timing controller is configured to alternately execute, within one frame period, a display mode in which the pixel array is driven by the gate driver and a touch sensing mode in which the touch sensor array is driven by the touch controller. This display device with a built-in touch panel detects a touch of a finger by acquiring an electrostatic capacitance (self-capacitance) of the touch sensor array in the touch sensing mode.

Further, there have been known mutual-capacitance type touch panels configured to detect a touch of a finger or the like by supplying a mutual capacitance drive signal to a drive electrode, and acquiring a mutual capacitance detection signal from a detection electrode adjacent to the drive electrode.

SUMMARY

Here, in the mutual-capacitance type touch panel in the related art, in a case in which a water droplet or the like adheres to the touch panel, a mutual capacitance between the drive electrode and the detection electrode may change, causing the touch panel to falsely detect a touch at the position where the water droplet or the like adhered. Accordingly, it is conceivable to configure a touch panel so that self-capacitance type touch detection, which does not detect a water droplet or the like, is implemented in a mutual-capacitance type touch panel to identify false detection caused by a water droplet or the like.

Nevertheless, in a case in which this touch panel is configured as a display device with a built-in touch panel, it is necessary to prevent voltage (drive signal for self-capacitance detection) applied to the touch sensor array from affecting the pixel array, and voltage applied to the pixels from affecting the touch sensor array.

Accordingly, it is conceivable to apply the configuration of the display device with a built-in touch panel described in JP 2012-59265 A to a display device with a built-in self-capacitance type and mutual-capacitance type touch panel. Nevertheless, in the configuration of JP 2012-59265 A described above, the display mode (period in which an image is displayed) and the touch sensing mode (period in which self-capacitance type touch detection is performed) are alternately executed within one frame period. While the effects of touch detection on display and the effects of display on touch detection are thus prevented, there is the disadvantage that the period of the display mode and the period of the touch sensing mode within one frame period are each shortened. As a result, in a case in which the number of pixel arrays is increased (display panel is made higher in definition), the period of the display mode in one pixel array is further shortened. Further, in a case in which one frame period is shortened (driving speed is increased), the period of the display mode is further shortened. Therefore, in a case in which the configuration of the display device with a built-in touch panel described in JP 2012-59265 A described above is applied, there is a problem in that it is difficult to increase the definition of the display panel and increase the driving speed.

Accordingly, the disclosure has been made in order to solve problems such as described above, and an object of the disclosure is to provide a display device with a built-in touch panel and a method for controlling a display device with a built-in touch panel capable of making a panel higher in definition and increasing a driving speed while preventing effects of self-capacitance type touch detection on display and effects of display on self-capacitance type touch detection.

In order to solve the problems described above, a display device with a built-in touch panel according to a first aspect of the disclosure is a display device including a plurality of thin film transistors, a plurality of gate lines connected to the plurality of thin film transistors, extending in a first direction, and disposed side by side in a second direction orthogonal to the first direction, a gate drive controller configured to sequentially supply a gate signal to the plurality of gate lines, a plurality of drive electrodes disposed side by side in the second direction, a plurality of detection electrodes disposed alternately with the plurality of drive electrodes in the second direction and forming an electrostatic capacitance with the plurality of drive electrodes, a mutual capacitance acquisition unit configured to supply a drive signal for mutual capacitance detection to the plurality of drive electrodes and acquire a mutual capacitance detection signal from the plurality of detection electrodes, and a self-capacitance acquisition unit configured to supply a drive signal for self-capacitance detection to the plurality of detection electrodes and acquire a self-capacitance detection signal from the plurality of detection electrodes. Each of the plurality of drive electrodes and the plurality of detection electrodes overlaps at least one of the plurality of gate lines in a plan view, and the self-capacitance acquisition unit is configured to supply the drive signal for self-capacitance detection to at least one of the plurality of detection electrodes while the gate signal is being supplied to gate lines of the plurality of gate lines overlapping any one of the plurality of drive electrodes.

A method for controlling a display device with a built-in touch panel according to a second aspect is a method for controlling a display device with a built-in touch panel, the display device including a plurality of thin film transistors, a plurality of gate lines connected to the plurality of thin film transistors, extending in a first direction, and disposed side by side in a second direction orthogonal to the first direction, a plurality of drive electrodes disposed side by side in the second direction, and a plurality of detection electrodes disposed alternately with the plurality of drive electrodes in the second direction and forming an electrostatic capacitance with the plurality of drive electrodes, each of the plurality of drive electrodes and the plurality of detection electrodes overlapping at least one of the plurality of gate lines in a plan view. The method includes sequentially supplying a gate signal to the plurality of gate lines, supplying a drive signal for mutual capacitance detection to the plurality of drive electrodes, acquiring a mutual capacitance detection signal from the plurality of detection electrodes, supplying a drive signal for self-capacitance detection to the plurality of detection electrodes, and acquiring a self-capacitance detection signal from the plurality of detection electrodes. The supplying of the drive signal for self-capacitance detection includes supplying the drive signal for self-capacitance detection to at least one of the plurality of detection electrodes while the gate signal is being supplied to gate lines of the plurality of gate lines overlapping any one of the plurality of drive electrodes.

In the display device with a built-in touch panel and the method for controlling a display device with a built-in touch panel of the configuration described above, while the gate signal is being supplied to the gate lines overlapping any one of the plurality of drive electrodes (period in which an image is displayed), the drive signal for self-capacitance detection is supplied to at least one of the plurality of detection electrodes not overlapping the gate lines and having a low possibility of affecting display, and not to the drive electrodes having a possibility of affecting display. Therefore, touch detection and display can be implemented in parallel while preventing the effects of touch detection (drive signal for self-capacitance detection) on display and the effects of display (gate signal) on touch detection. As a result, the driving of the touch panel can be increased in speed. Then, the gate signal can be supplied to a larger number of gate lines per frame, making it possible to increase the number of gate lines and the number of pixel electrodes and thus make the panel (display panel) higher in definition.

BRIEF DESCRIPTION OF DRAWINGS

The disclosure will be described with reference to the accompanying drawings, wherein like numbers reference like elements.

DESCRIPTION OF EMBODIMENTS

Figure 1:
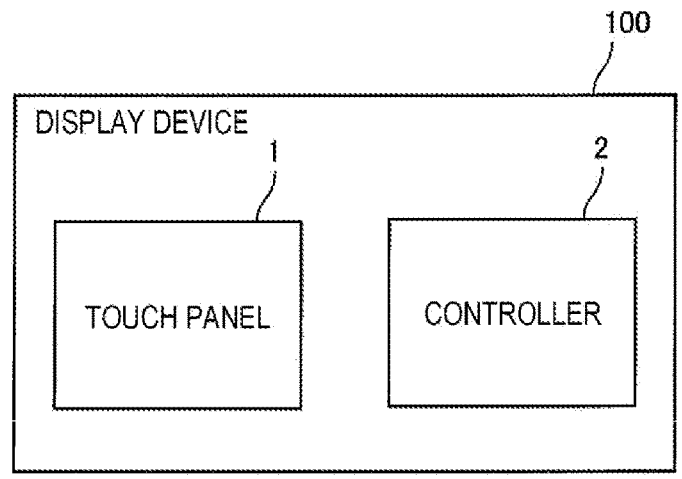
FIG. 1 is a block diagram illustrating a configuration of a display device according to a first embodiment.

Hereinafter, embodiments of the disclosure will be described in detail with reference to the drawings. In the drawings, the same or corresponding portions are denoted by the same reference numerals and signs, and the description thereof will not be repeated. Note that, for ease of description, in the drawings referred to below, configurations may be simplified or schematically illustrated, and some components may be omitted. Further, dimensional ratios between components illustrated in the drawings are not necessarily indicative of actual dimensional ratios.

First Embodiment

FIG. 1 explains a configuration of a display device 100 with a built-in touch panel (hereinafter referred to as "display device 100") according to a first embodiment. FIG. 1 is a block diagram illustrating a functional configuration of the display device 100 according to the first embodiment.

As illustrated in FIG. 1, the display device 100 includes a touch panel 1 and a controller 2. The touch panel 1 is, for example, a full in-cell type touch panel. The touch panel 1 also functions as a display panel for displaying a video or an image. The controller 2 executes each control process in the display device 100 on the basis of a touch position acquired from the touch panel 1.

Figure 2:
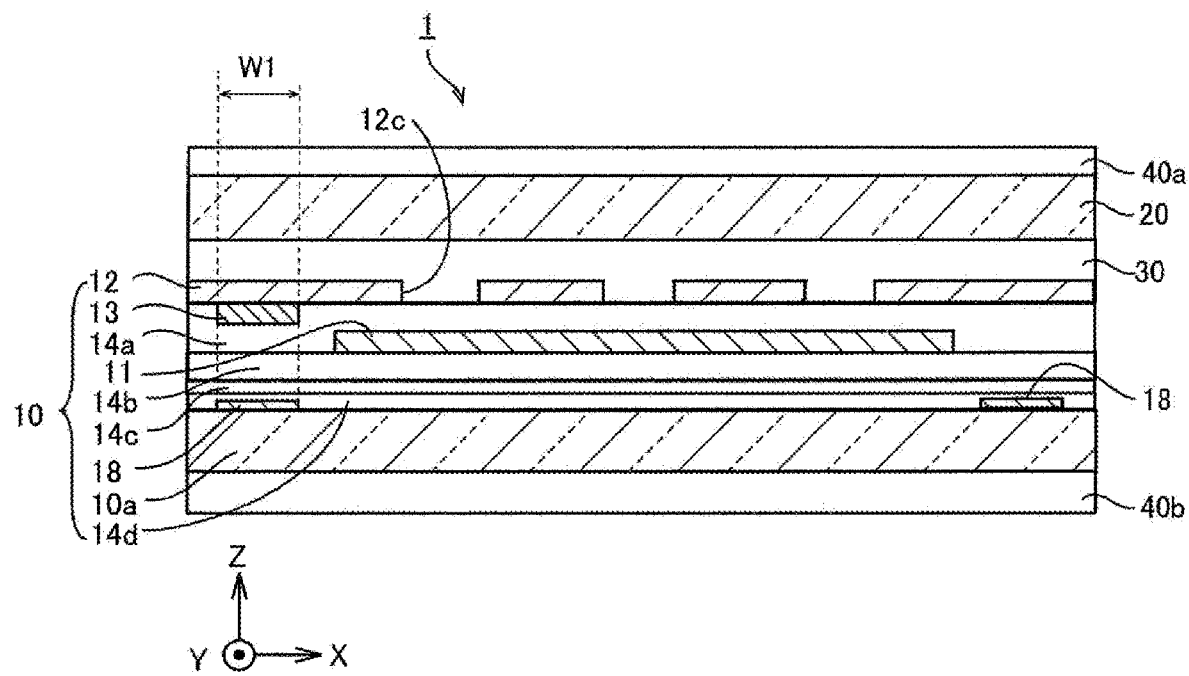
FIG. 2 is a cross-sectional view taken along a direction (X direction) in which a gate line extends.
Figure 3:
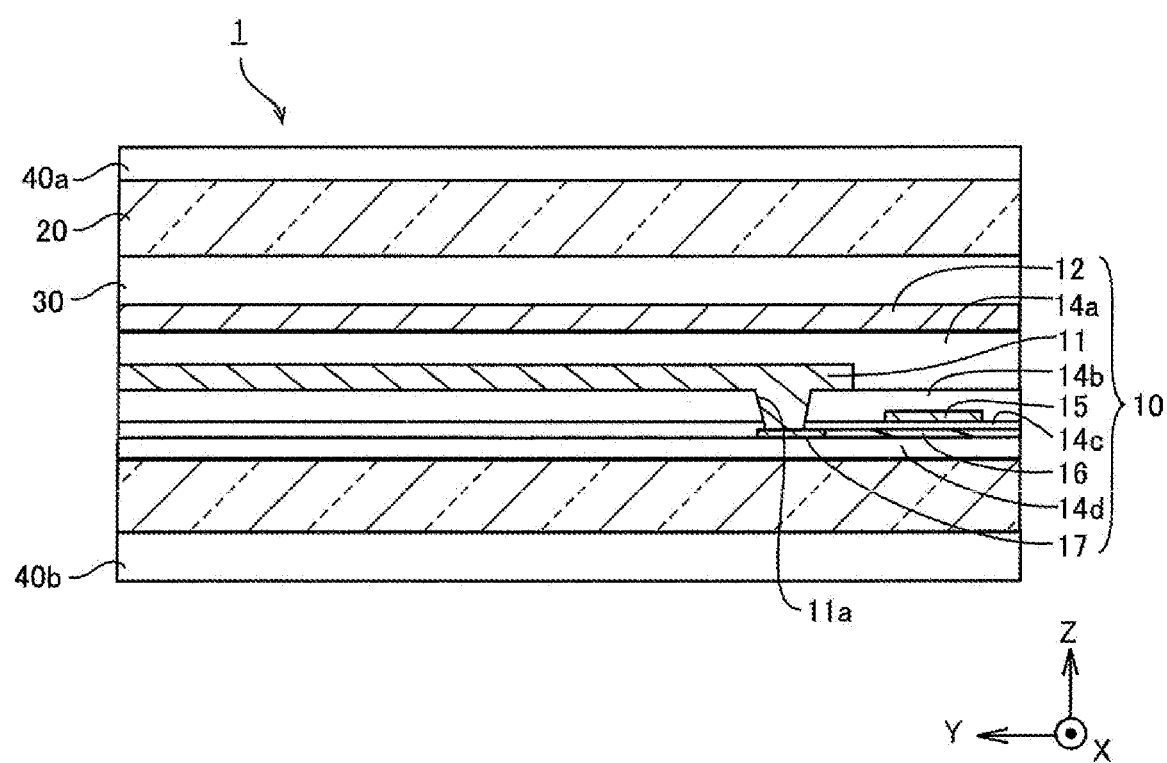
FIG. 3 is a cross-sectional view taken along a direction (Y direction) in which a touch signal line extends.

Further, FIG. 2 is a cross-sectional view taken along a direction (X direction) in which a gate line 15 extends, and FIG. 3 is a cross-sectional view taken along a direction (Y direction) in which a touch signal line 13 extends. As illustrated in FIG. 2, the touch panel 1 includes an active matrix substrate 10, a counter substrate 20, and a liquid crystal layer 30 interposed between the active matrix substrate 10 and the counter substrate 20. In addition, a pair of polarizers 40a and 40b are provided to sandwich the active matrix substrate 10 and the counter substrate 20 therebetween. A color filter (not illustrated) is disposed on the counter substrate 20. A front face of the polarizer 40a is provided with a protective glass or the like (not illustrated). An outermost layer of this protective glass or the like forms a touch surface.

For example, a user visually recognizes an image from the front face side of the polarizer 40a. Further, the touch panel 1 receives a touch operation by, for example, a finger (indicator) on the touch surface. Further, the touch panel 1 employs a transverse electrical field driving method as a driving method of liquid crystal molecules included in the liquid crystal layer 30. In order to realize the transverse electrical field driving method, a pixel electrode 11 and a touch sensor electrode 12 for forming an electrical field are formed on the active matrix substrate 10. Note that the "touch sensor electrode 12" is either a drive electrode 12a or a detection electrode 12b, but is described as the "touch sensor electrode 12" in this specification in a case in which the drive electrode 12a and the detection electrode 12b are not distinguished. The touch sensor electrode 12 functions as a common electrode facing a plurality of the pixel electrodes 11. The touch sensor electrode 12 is provided in common to the plurality of pixel electrodes 11. Further, as illustrated in FIG. 2, one or a plurality of slits 12c are provided in the touch sensor electrode 12.

As illustrated in FIG. 2, in the active matrix substrate 10, the touch sensor electrode 12, the touch signal line 13, a first insulating layer 14a, the pixel electrode 11, a second insulating layer 14b, the gate line 15 (refer to FIG. 3), a third insulating layer 14c, a semiconductor layer 16 (refer to FIG. 3) and a drain electrode 17 (refer to FIG. 3), a fourth insulating layer 14d, a source line 18, and a glass substrate 10a are disposed in this order from the touch surface side. Further, in a plan view, the touch sensor electrode 12 overlaps the pixel electrode 11. Further, the touch signal line 13 overlaps the source line 18 in a plan view. Further, as illustrated in FIG. 2, a width W1 of the touch signal line 13 is the same as a width of the source line 18. Further, the touch signal line 13 extends parallel to the source line 18. According to this configuration, compared to a case in which a plurality of source lines 18 and a plurality of touch signal lines 13 are disposed offset from each other in a plan view, dimensions of the touch panel 1 in a plan view can be reduced.

Figure 4:
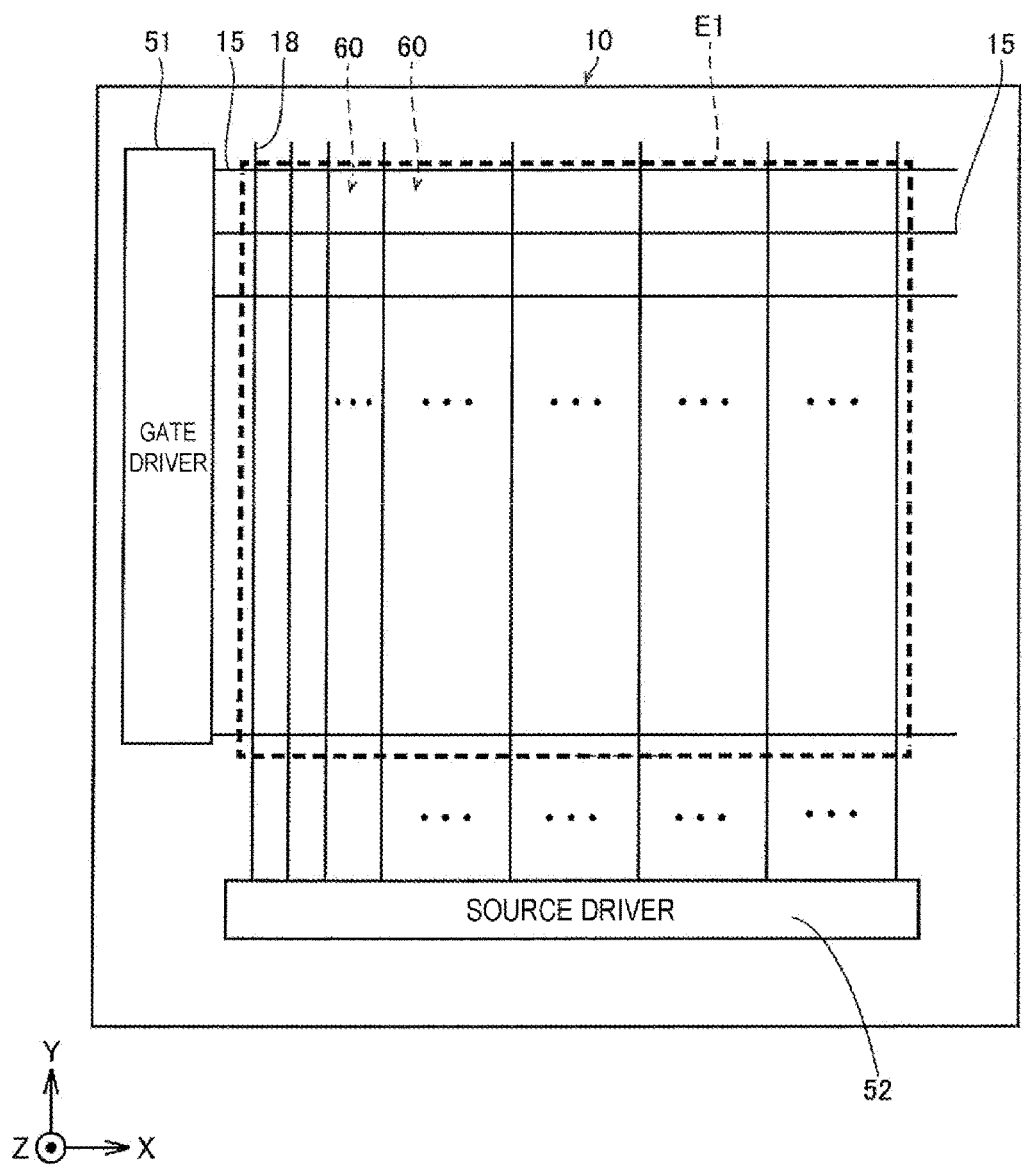
FIG. 4 is a schematic plan view of an active matrix substrate.

FIG. 4 is a schematic plan view for explaining a connection between a gate driver 51 (gate drive controller) as well as a source driver 52 and a thin film transistor 60. The active matrix substrate 10 is provided with the gate driver 51 and the source driver 52. A plurality of the gate lines 15 and a plurality of the source lines 18 intersect each other and are formed into a lattice pattern in a plan view. Further, as illustrated in FIG. 4, the thin film transistors 60 are provided in regions surrounded by the plurality of gate lines 15 and the plurality of source lines 18.

Figure 5:
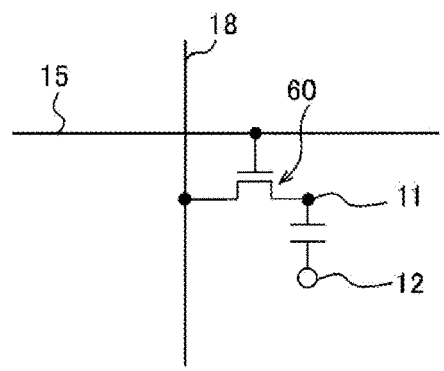
FIG. 5 is a circuit diagram for explaining a connection relationship between a thin film transistor and a gate line as well as a source line.

FIG. 5 is a schematic circuit diagram for explaining a connection between the thin film transistor 60 and the gate line 15 as well as the source line 18. As illustrated in FIG. 5, a gate electrode of the thin film transistor 60 is connected to the gate line 15, and a source electrode of the thin film transistor 60 is connected to the source line 18. Further, a drain electrode of the thin film transistor 60 is connected to the pixel electrode 11 via a contact hole 11a (refer to FIG. 3). Further, the pixel electrode 11 forms an electrostatic capacitance with the touch sensor electrode 12.

Further, the plurality of gate lines 15 connect each of the plurality of thin film transistors 60 and the gate driver 51. Further, the plurality of source lines 18 connect each of the plurality of thin film transistors 60 and the source driver 52. Further, the gate driver 51 and the source driver 52 are each disposed in a frame region outside of a display region E1 in which the plurality of pixel electrodes 11 are disposed. The gate driver 51 and the source driver 52 are constituted by an integrated circuit, for example. The gate driver 51 supplies gate signals (scanning signals) sequentially to each of the plurality of gate lines 15. Specifically, the gate driver 51 sequentially applies voltage to (scans) the plurality of gate lines 15 at a predetermined frequency on the basis of a horizontal synchronization signal from the controller 2. The source driver 52 supplies a source signal (data signal) to each of the plurality of source lines 18.

Figure 6:
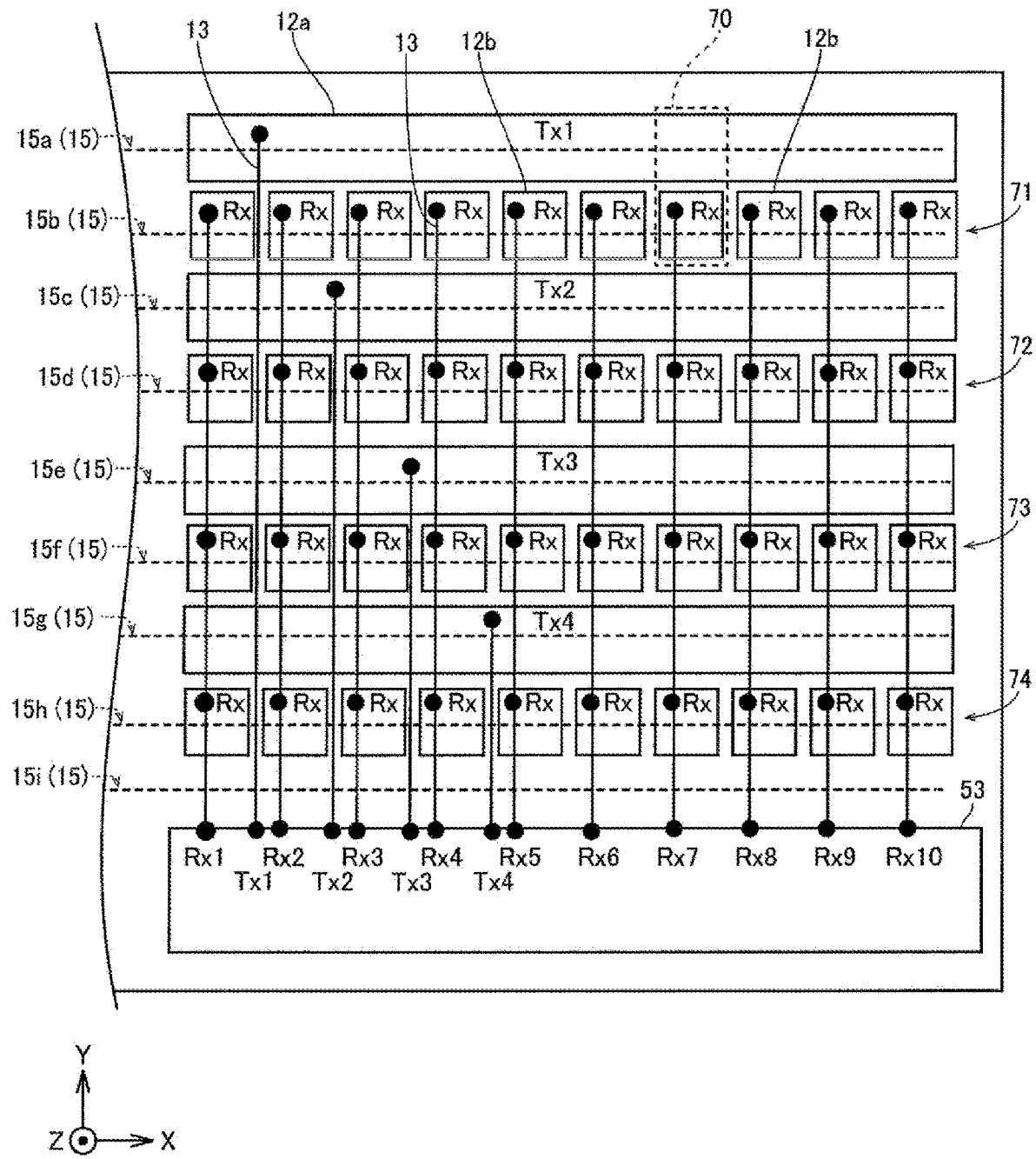
FIG. 6 is a plan view schematically illustrating a configuration of drive electrodes and detection electrodes.

FIG. 6 is a schematic plan view for explaining an arrangement relationship between the drive electrode 12a and the detection electrode 12b, the touch signal line 13, and a touch detection driver 53. The active matrix substrate 10 is provided with the touch detection driver 53. The touch detection driver 53 includes an integrated circuit configured to perform control processing related to touch detection. The touch detection driver 53 functions as a mutual capacitance acquisition unit configured to supply a drive signal for mutual capacitance detection (hereinafter referred to as "drive signal dm") to the plurality of drive electrodes 12a via the touch signal lines 13, and acquire a mutual capacitance detection signal (hereinafter referred to as "detection signal rm") from the plurality of detection electrodes 12b via the touch signal lines 13. Further, the touch detection driver 53 functions as a self-capacitance acquisition unit configured to supply a drive signal for self-capacitance detection (hereinafter referred to as "drive signal ds") to the plurality of detection electrodes 12b via the touch signal lines 13, and acquire a self-capacitance detection signal (hereinafter referred to as "detection signal rs") from the plurality of detection electrodes 12b via the touch signal lines 13. That is, the touch panel 1 is configured to be capable of performing mutual-capacitance type touch detection, and to be capable of performing self-capacitance type (self-sensing type) touch detection. In the touch panel 1, in the mutual-capacitance type touch detection, a unit cell 70 described below is configured to detect a touch position as a single coordinate (unit).

Each of the plurality of drive electrodes 12a is a transmitter electrode (Tx) to which the drive signal dm is supplied. The plurality of detection electrodes 12b are disposed adjacent to the plurality of drive electrodes 12a in a plan view, and form an electrostatic capacitance with the plurality of drive electrodes 12a. Each of the plurality of detection electrodes 12b is a receiver electrode (Rx) that supplies the detection signal rm to the touch detection driver 53.

The plurality of drive electrodes 12a each extend in a direction (X direction) in which the gate line 15 (refer to FIG. 6) extends, and are disposed side by side in a direction (Y direction) orthogonal to the X direction. Note that, in FIG. 6, for ease of explanation, four drive electrodes 12a and 40 detection electrodes 12b are illustrated, but the number and arrangement of the drive electrodes 12a and the detection electrodes 12b are not limited thereto.

Figure 7:
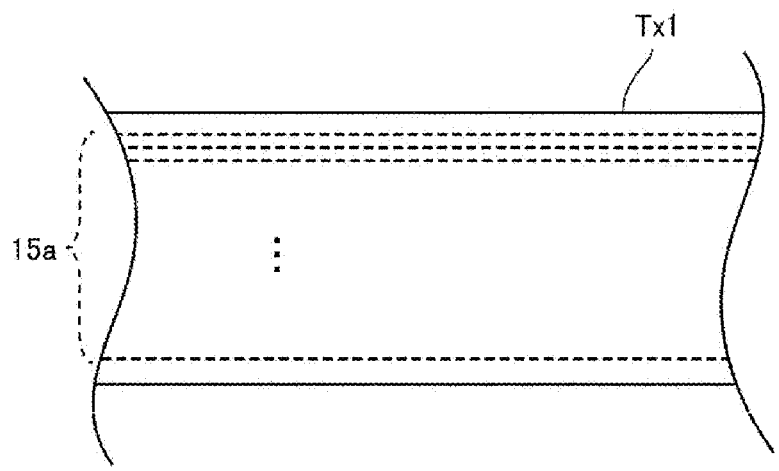
FIG. 7 is a plan view schematically illustrating a configuration of a gate line group.

Further, as illustrated in FIG. 6, the drive electrodes 12a are denoted as Tx1, Tx2, Tx3, and Tx4 in order from an upper side in FIG. 6, and the detection electrodes 12b are denoted as Rx1, Rx2, . . . , Rx10 in order from a left side in FIG. 6. Further, the plurality of gate lines 15 are denoted as gate line groups 15a, 15b, 15c, 15d, 15e, 15f, 15g, 15h, and 15i in order from the upper side in FIG. 6. Tx1, Tx2, Tx3, and Tx4 overlap the gate line groups 15a, 15c, 15e, and 15g, respectively, in a plan view. FIG. 7 is a diagram for explaining a configuration of the gate line group 15a. As illustrated in FIG. 7, the gate line group 15a includes a plurality of the gate lines 15, but is illustrated as one line in FIG. 6 for ease of explanation.

Further, Rx1 to Rx10 are each provided in the same quantity as the drive electrode 12a. Then, from the upper side in FIG. 6, the drive electrodes 12a and the detection electrodes 12b are alternately disposed in the order of Tx1, Rx1 to Rx10, Tx2, Rx1 to Rx10, Tx3, Rx1 to Rx10, Tx4, and Rx1 to Rx10. Here, Rx1 to Rx10 disposed between Tx1 and Tx2 are denoted as detection electrode group 71, Rx1 to Rx10 disposed between Tx2 and Tx3 are denoted as detection electrode group 72, Rx1 to Rx10 disposed between Tx3 and Tx4 are denoted as detection electrode group 73, and Rx1 to Rx10 below Tx4 in FIG. 6 are denoted as detection electrode group 74. The detection electrode groups 71, 72, 73, and 74 overlap the gate line groups 15b, 15d, 15f, and 15h, respectively, in a plan view. Note that, in a plan view, the gate line group 15i is disposed at a position not overlapping both the drive electrode 12a and the detection electrode 12b.

Further, the plurality of Rx1s are connected to each other via the touch signal line 13. Then, the touch signal line 13 connected to the plurality of Rx1s is connected to the touch detection driver 53. Further, Rx2 to Rx10 are similar to Rx1, and thus descriptions thereof will be omitted.

Figure 8:
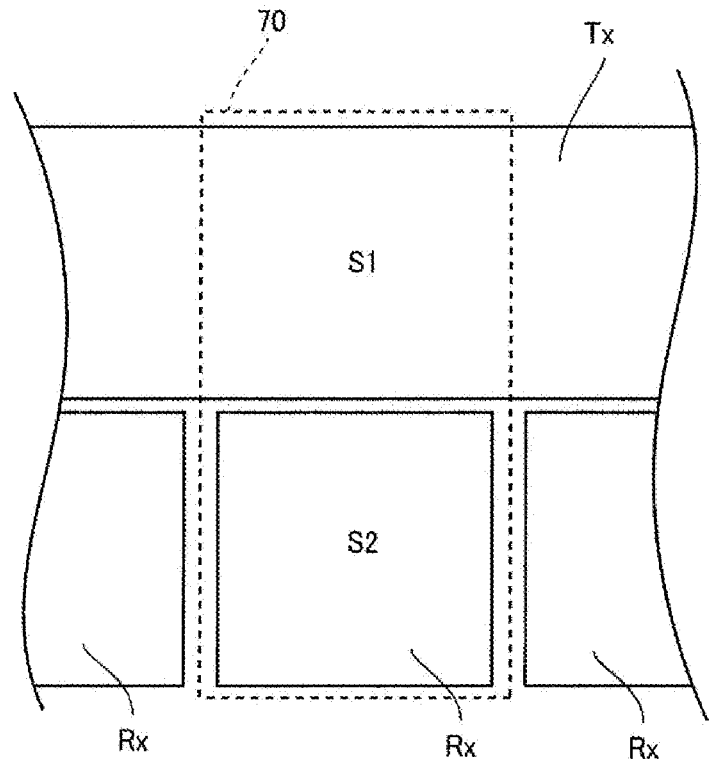
FIG. 8 is a schematic plan view for explaining a unit cell according to the first embodiment.

FIG. 8 is a schematic diagram for explaining a configuration of the unit cell 70. Tx1 to Tx4 and Rx1 to Rx10 constitute a plurality of the unit cells 70. The unit cell 70 is a unit constituting one coordinate in the touch panel 1, and the number of unit cells 70 is equal to the number of Rx1 to Rx10s (40, for example). As illustrated in FIG. 8, in a plan view, the unit cell 70 includes a portion of Tx1, and Rx having a rectangular shape and adjacent to the Tx1 in the Y direction. According to this configuration, a boundary between the Rxs having rectangular shapes is formed in the X direction (direction in which the gate lines 15 extend) or the Y direction (direction in which the source lines 18 extend), making it possible to easily form the Rxs on the substrate since there is no need to cross the boundaries in the X direction and the Y direction. Further, in a plan view, an area S2 of Rx having a rectangular shape is equal to an area S1 of a corresponding portion of the drive electrode 12a, in the unit cell 70.

Method for Control According to First Embodiment

Figure 9:
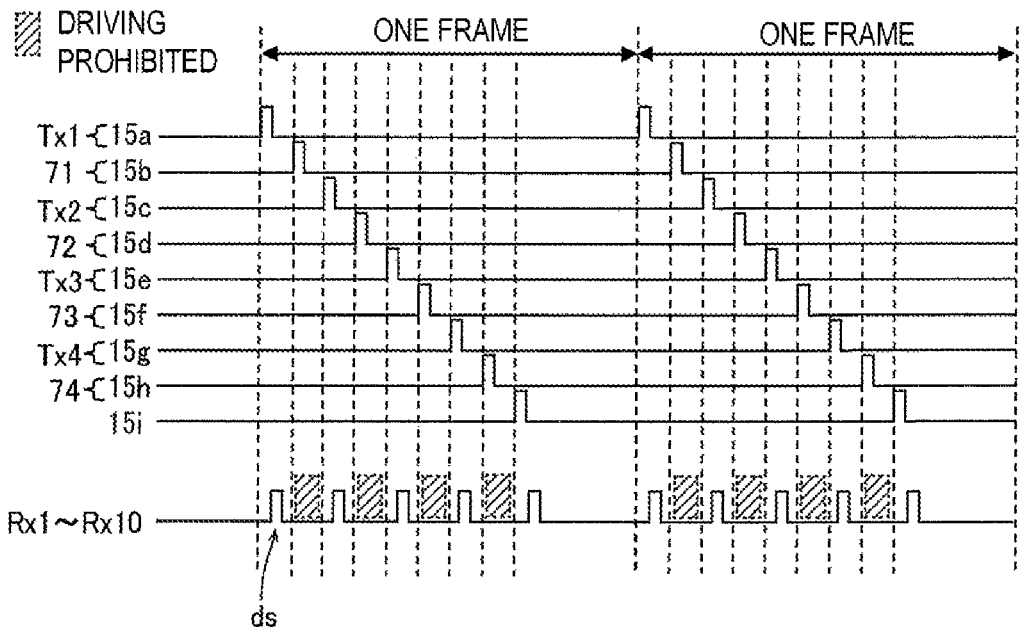
FIG. 9 is a timing diagram related to self-capacitance type touch detection of the display device according to the first embodiment.
Figure 10:
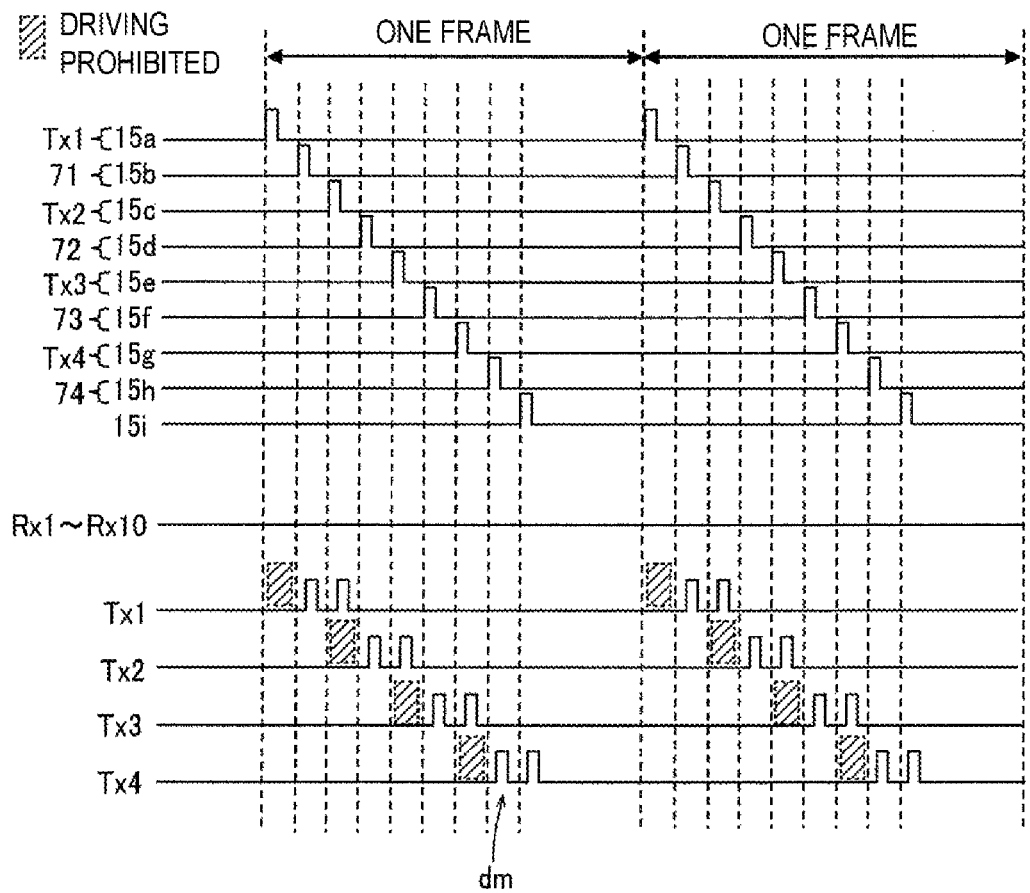
FIG. 10 is a timing diagram related mutual-capacitance type touch detection of the display device according to the first embodiment.

Next, a method for control by the display device 100 according to the first embodiment will be described with reference to FIG. 9 and FIG. 10. FIG. 9 is a timing chart for explaining a timing of transmission of the gate signal and the drive signal ds according to the first embodiment. FIG. 10 is a timing chart for explaining a timing of transmission of the gate signal and the drive signal dm according to the first embodiment. Note that, in the display device 100 (touch panel 1), the self-capacitance type touch detection and the mutual-capacitance type touch detection may be alternately performed for each of a plurality of frames or may be performed alternately for each frame, or the self-capacitance type touch detection and the mutual-capacitance type touch detection may be switched according to a command from the controller 2. Then, in the display device 100, detection of an object other than an indicator (finger or the like) such as a water droplet is performed in order to prevent false detection, on the basis of a difference between the self-capacitance type touch detection and the mutual-capacitance type touch detection.

Self-Capacitance Type Touch Detection

As illustrated in FIG. 9, in the first embodiment, the touch detection driver 53 is configured to supply the drive signal ds to at least one of the plurality of detection electrodes 12b while the gate signal is being supplied to the gate lines 15 overlapping any one of the plurality of drive electrodes 12a.

Specifically, the touch detection driver 53 supplies the drive signal ds to all detection electrodes 12b while the gate signal is being supplied to the gate lines 15 of any of the gate line groups 15a, 15c, 15e, and 15g.

For example, as illustrated in FIG. 9, the gate signal is sequentially supplied to the gate line groups 15a to 15i within a period of one frame. Note that, while FIG. 9, for ease of explanation, illustrates the gate signal being supplied to each gate line group, the gate signal is sequentially supplied (one at a time) to the plurality of gate lines 15 included in the gate line group 15a. Then, after the gate signal is supplied to all of the plurality of gate lines 15 included in the gate line group 15a, the gate signal is sequentially supplied to each of the plurality of gate lines 15 included in the gate line group 15b.

Here, the drive signal ds is supplied to all of the detection electrodes 12b during periods in which the gate signal is supplied to the gate line groups 15a, 15c, 15e, 15g, and 15i, whereas the drive signal ds is not supplied to any of the plurality of detection electrodes 12b (location denoted as "drive NG" in FIG. 9) during periods in which the gate signal is supplied to the gate line groups 15b, 15d, 15f, and 15h. Then, at the moment when the period within one frame ends, the touch detection driver 53 detects a touch of an indicator such as a finger on the basis of the detection signal rs acquired from each of the plurality of detection electrodes 12b (Rx1 to Rx10). For example, the touch detection driver 53 adds the detection signals rs acquired from the plurality of detection electrodes 12b within a period of one frame, for each detection electrode 12b. Then, the touch detection driver 53 acquires the touch position on the basis of the data thus added. Then, the touch detection driver 53 outputs the touch position to the controller 2.

According to the configuration described above, while the gate signal is being supplied to the gate lines 15 overlapping any one of the plurality of drive electrodes 12a (period in which an image is displayed), the drive signal ds is supplied to at least one of the plurality of detection electrodes 12b not overlapping the gate lines 15 and having a low possibility of affecting display, and not to the drive electrodes 12a having a possibility of affecting display. Therefore, touch detection and display can be implemented in parallel while preventing the effects of touch detection (drive signal ds) on display and the effects of display (gate signal) on touch detection. As a result, the driving of the touch panel 1 can be increased in speed. Then, the gate signal can be supplied to a larger number of the gate lines 15 per frame, making it possible to increase the number of gate lines 15 and the number of pixel electrodes 11 and thus make the panel (display panel) higher in definition.

Mutual-Capacitance Type Touch Detection

As illustrated in FIG. 10, in the first embodiment, the touch detection driver 53 is configured to, while the gate signal is being supplied to the gate lines 15 overlapping any one of the plurality of drive electrodes 12a, supply the drive signal dm to the other drive electrodes 12a of the plurality of drive electrodes 12a. Further, the touch detection driver 53 is configured to supply the drive signal dm to at least one of the plurality of drive electrodes 12a while the gate signal is being supplied to the gate lines 15 overlapping any one of the plurality of detection electrodes 12b.

For example, as illustrated in FIG. 10, the gate signal is sequentially supplied to the gate line groups 15a to 15i within a period of one frame. The drive signal dm is not supplied to Tx1 during a period in which the gate signal is supplied to the gate line group 15a overlapping Tx1 in a plan view. Further, the drive signal dm is supplied to Tx1 during a period in which the gate signal is supplied to the gate line group 15b overlapping the detection electrode group 71 in a plan view. Further, the drive signal dm is not supplied to Tx2 and the drive signal dm is supplied to Tx1 during a period in which the gate signal is supplied to the gate line group 15c overlapping Tx2 in a plan view.

Further, the drive signal dm is supplied to Tx2 during a period in which the gate signal is supplied to the gate line group 15d overlapping the detection electrode group 72 in a plan view. Further, the drive signal dm is not supplied to Tx3 and the drive signal dm is supplied to Tx2 during a period in which the gate signal is supplied to the gate line group 15e overlapping Tx3 in a plan view.

Further, the drive signal dm is supplied to Tx3 during a period in which the gate signal is supplied to the gate line group 15f overlapping the detection electrode group 73 in a plan view. Further, the drive signal dm is not supplied to Tx4 and the drive signal dm is supplied to Tx3 during a period in which the gate signal is supplied to the gate line group 15g overlapping Tx4 in a plan view.

Further, the drive signal dm is supplied to Tx4 during a period in which the gate signal is supplied to the gate line group 15h overlapping the detection electrode group 74 in a plan view. Further, the drive signal dm is supplied to Tx4 during a period in which the gate signal is supplied to the gate line group 15i. Then, at the moment when the period of one frame ends, the touch detection driver 53 detects a touch of an indicator such as a finger on the basis of the detection signal rm acquired from each of the plurality of detection electrodes 12b. For example, the touch detection driver 53 adds the detection signals rm acquired from the plurality of detection electrodes 12b within a period of one frame, for each detection electrode 12b. The touch detection driver 53 acquires the touch position on the basis of the data thus added. Then, the touch detection driver 53 outputs the touch position to the controller 2. According to this configuration, even when mutual-capacitance type touch detection is performed, the effects of touch detection on display and the effects of display on touch detection can be prevented.

Second Embodiment

Next, a configuration of a display device 200 with a built-in touch panel (hereinafter referred to as "display device 200") according to a second embodiment will be described with reference to FIG. 11 and FIG. 12. In the display device 200 according to the second embodiment, a touch detection driver 253 of a touch panel 201 supplies the drive signal ds to the drive electrode 12a in addition to the detection electrode 12b. Note that, in the following description, when the same reference numerals as in the first embodiment are used, the same configurations as in the first embodiment are indicated, and reference is made to the preceding description unless otherwise described.

Configuration of Display Device According to Second Embodiment

Figure 11:
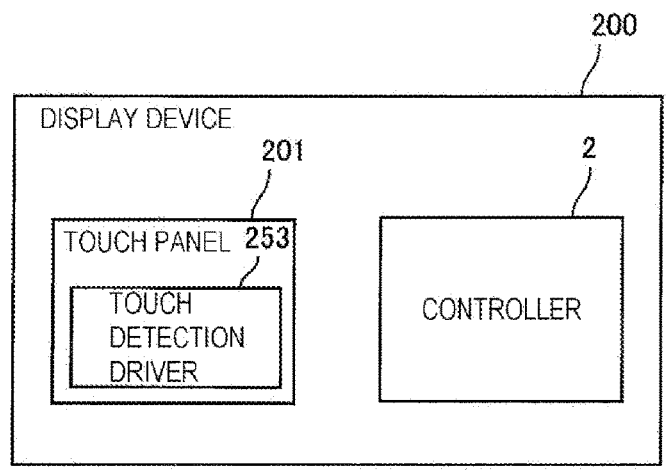
FIG. 11 is a block diagram illustrating a configuration of a display device according to a second embodiment.

FIG. 11 is a block diagram of the display device 200. The display device 200 includes the touch panel 201 provided with the touch detection driver 253, and the controller 2. Note that the other configurations of the display device 200 according to the second embodiment are the same as the configurations of the display device 100 according to the first embodiment.

Method for Controlling Display Device According to Second Embodiment

Figure 12:
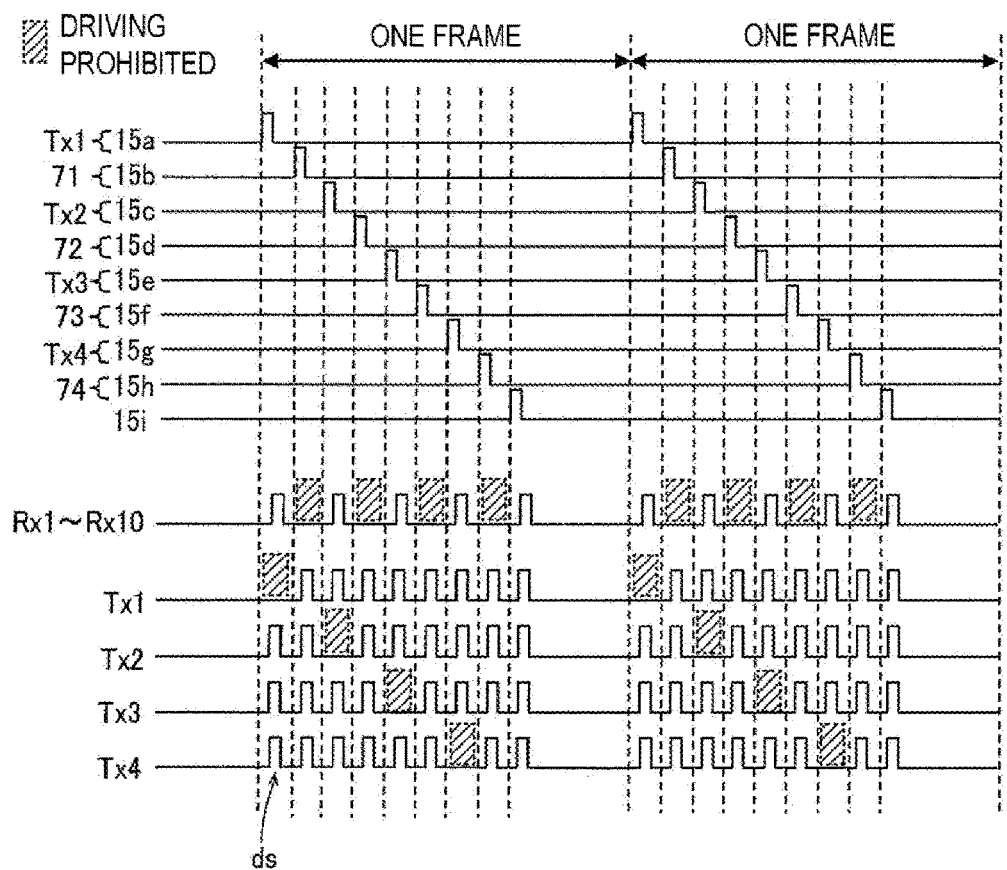
FIG. 12 is a timing diagram related to self-capacitance type touch detection of the display device according to the second embodiment.

FIG. 12 is a timing chart for explaining a timing of transmission of the gate signal and the drive signal ds by the display device 200 according to the second embodiment. Note that the timing of transmission of the drive signal dm by the display device 200 according to the second embodiment (configuration related to the mutual-capacitance type touch detection) is the same as that of the first embodiment, and thus description thereof will be omitted.

Self-Capacitance Type Touch Detection

In the second embodiment, the touch detection driver 253 is configured to, while the gate signal is being supplied to the gate lines 15 overlapping any one of the plurality of drive electrodes 12a, supply the drive signal ds to the other drive electrodes of the plurality of drive electrodes 12a. Further, the touch detection driver 253 is configured to supply the drive signal ds to at least one of the plurality of drive electrodes 12a while the gate signal is being supplied to the gate lines 15 overlapping any one of the plurality of detection electrodes 12b.

Specifically, as illustrated in FIG. 12, the gate signal is sequentially supplied to the gate line groups 15a to 15i within a period of one frame. The drive signal ds is not supplied to Tx1 and the drive signal ds is supplied to Rx1 to Rx10 and Tx2 to Tx4 during a period in which the gate signal is supplied to the gate line group 15a overlapping Tx1 in a plan view.

Further, the drive signal ds is not supplied to Tx2 and the drive signal ds is supplied to Rx1 to Rx10 and Tx1, Tx3, and Tx4 during a period in which the gate signal is supplied to the gate line group 15c overlapping Tx2 in a plan view.

Further, the drive signal ds is not supplied to Tx3 and the drive signal ds is supplied to Rx1 to Rx10 and Tx1, Tx2, and Tx4 during a period in which the gate signal is supplied to the gate line group 15e overlapping Tx3 in a plan view.

Further, the drive signal ds is not supplied to Tx4 and the drive signal ds is supplied to Rx1 to Rx10 and Tx1 to Tx3 during a period in which the gate signal is supplied to the gate line group 15g overlapping Tx4 in a plan view.

Further, the drive signal ds is not supplied to Rx1 to Rx10 and the drive signal ds is supplied to Tx1 to Tx4 during a period in which the gate signal is supplied to any of the gate line groups 15b, 15d, and 15f overlapping any of the detection electrode groups 71 to 74 in a plan view.

Further, during a period in which the gate signal is supplied to the gate line group 15i, the drive signal ds is supplied to Rx1 to Rx10 and Tx1 to Tx4. Then, at the moment when the period of one frame ends, the touch detection driver 253 detects a touch of an indicator such as a finger on the basis of the detection signal rs acquired from each of the plurality of drive electrodes 12a and the plurality of detection electrodes 12b. Then, the touch detection driver 253 outputs the touch position to the controller 2.

According to the configuration of the second embodiment described above, the drive signal ds is supplied to the drive electrodes 12a other than the drive electrode 12a overlapping the gate lines 15 to which the gate signal is supplied. Further, the drive signal ds is supplied to the drive electrode 12a while the gate signal is being supplied to the gate lines 15 overlapping the detection electrode 12b and not the drive electrode 12a. As a result, even in a case in which self-capacitance type touch detection is performed by using not only the plurality of detection electrodes 12b, but also the plurality of drive electrodes 12a, the effects of touch detection on display and the effects of display on touch detection can be prevented. Note that the other effects of the second embodiment are the same as the effects of the first embodiment.

Third Embodiment

Next, a configuration of a display device 300 with a built-in touch panel (hereinafter referred to as "display device 300") according to a third embodiment will be described with reference to FIG. 13 and FIG. 14. In the display device 300 according to the third embodiment, a touch detection driver 353 of a touch panel 301 supplies the drive signal ds at the same timing for all the drive electrodes 12*a*. Further, in a case in which the same reference numerals as in the first or second embodiment are used in the following description, they represent the same configurations as in the first or second embodiment, and reference is made to the preceding description unless otherwise described.

Configuration of Display Device According to Third Embodiment

Figure 13:
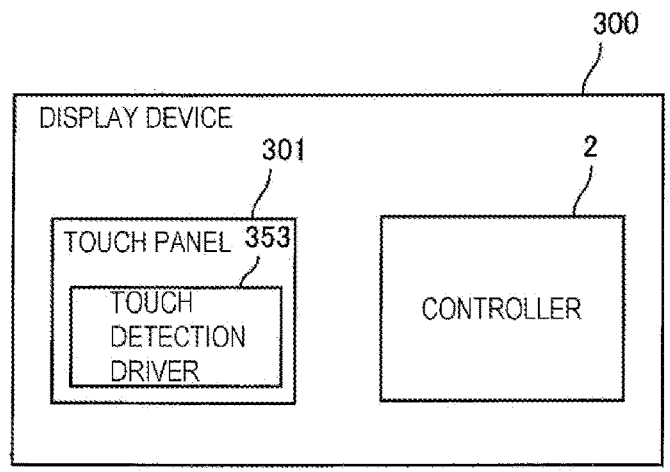
FIG. 13 is a block diagram illustrating a configuration of a display device according to a third embodiment.

FIG. 13 is a block diagram of the display device 300. The display device 300 includes the touch panel 301 provided with the touch detection driver 353, and the controller 2. Note that the other configurations of the display device 300 according to the third embodiment are the same as the configurations of the display device 100 according to the first embodiment.

Method for Controlling Display Device According to Third Embodiment

Figure 14:
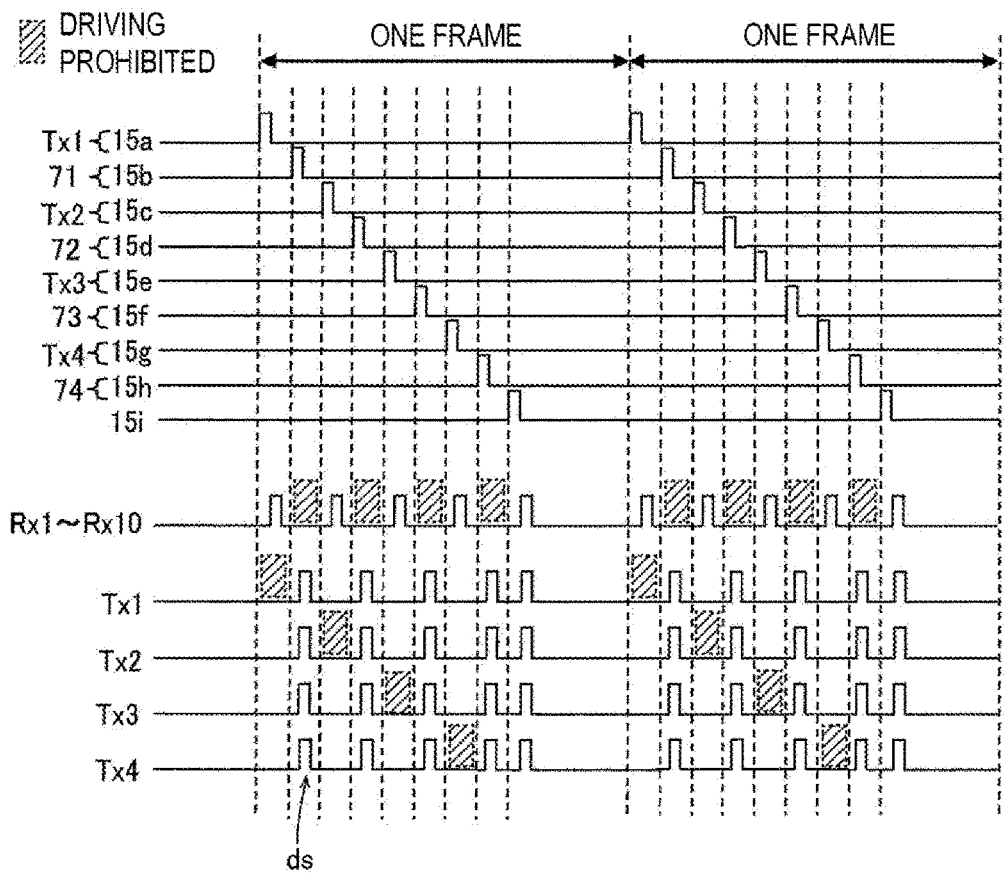
FIG. 14 is a timing diagram related to self-capacitance type touch detection of the display device according to the third embodiment.

FIG. 14 is a timing chart for explaining a timing of transmission of the gate signal and the drive signal ds by the display device 300 according to the third embodiment. Note that the timing of transmission of the drive signal dm by the display device 300 according to the third embodiment (configuration related to mutual-capacitance type touch detection) is the same as that of the first embodiment, and thus description thereof will be omitted.

Self-Capacitance Type Touch Detection

In the third embodiment, the touch detection driver 353 supplies the drive signal ds at the same timing for all of the drive electrodes 12*a* during a period other than the period in which the gate signal is supplied to the gate lines 15 overlapping any one of the plurality of drive electrodes 12*a*.

Specifically, as illustrated in FIG. 14, the gate signal is sequentially supplied to the gate line groups 15*a* to 15*i* within a period of one frame. The drive signal ds is not supplied to Tx1 to Tx4 and the drive signal ds is supplied to Rx1 to Rx10 during a period in which the gate signal is supplied to any of the gate line group 15*a*, 15*c*, 15*e*, and 15*g* overlapping any of Tx1 to Tx4 in a plan view.

Further, the drive signal ds is not supplied to Rx1 to Rx10 and the drive signal ds is supplied to Tx1 to Tx4 during a period in which the gate signal is supplied to the gate line groups 15*b*, 15*d*, 15*f*, and 15*h* overlapping Rx1 to Rx10 in a plan view. Further, during a period in which the gate signal is supplied to the gate line group 15*i*, the drive signal ds is supplied to Rx1 to Rx10 and Tx1 to Tx4. Then, at the moment when the period of one frame ends, the touch detection driver 353 detects a touch of an indicator such as a finger on the basis of the detection signal rs acquired from each of the plurality of drive electrodes 12*a* and the plurality of detection electrodes 12*b*. Then, the touch detection driver 353 outputs the touch position to the controller 2.

According to the configuration of the third embodiment described above as well, similarly to the configuration of the second embodiment described above, even in a case in which self-capacitance type touch detection is performed by using not only the plurality of detection electrodes 12*b*, but also the plurality of drive electrodes 12*a*, the effects of touch detection on display and the effects of display on touch detection can be prevented. Further, the drive signal ds is supplied at the same timing to all of the drive electrodes 12*a*, and thus the control method of the touch panel 301 can be simplified. Note that the other effects of the third embodiment are the same as the effects of the first embodiment.

Fourth Embodiment

Next, a configuration of a display device 400 with a built-in touch panel (hereinafter referred to as "display device 400") according to a fourth embodiment will be described with reference to FIG. 15 to FIG. 18. A unit cell 470 of the display device 400 according to the fourth embodiment is provided with a portion of a drive electrode 412*a* (Tx), and a detection electrode 412*b* (Rx) on both sides of the Tx in the Y direction. Note that, in the following description, when the same reference numerals as in the first to third embodiments are used, the same configurations as in the first to third embodiments are indicated, and reference is made to the preceding description unless otherwise described.

Configuration of Display Device According to Fourth Embodiment

Figure 15:
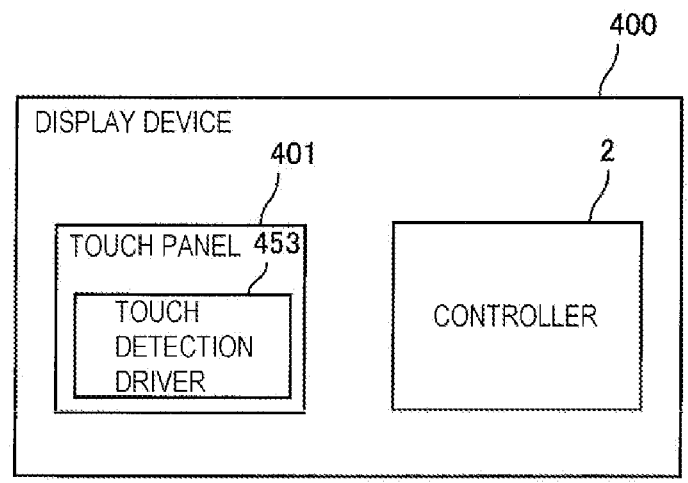
FIG. 15 is a block diagram illustrating a configuration of a display device according to a fourth embodiment.

FIG. 15 is a block diagram of the display device 400. The display device 400 includes a touch panel 401 provided with a touch detection driver 453, and the controller 2.

Figure 16:
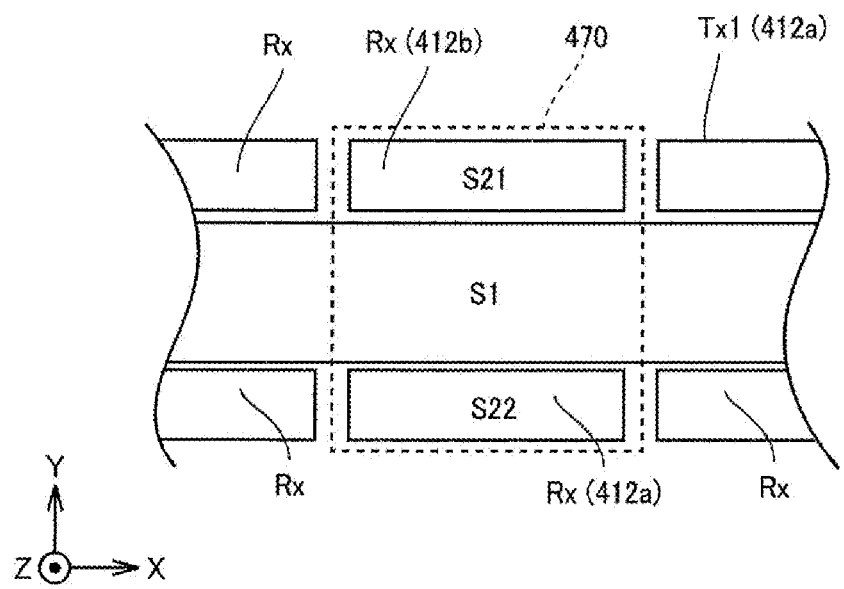
FIG. 16 is a schematic plan view for explaining a unit cell according to the fourth embodiment.
Figure 17:
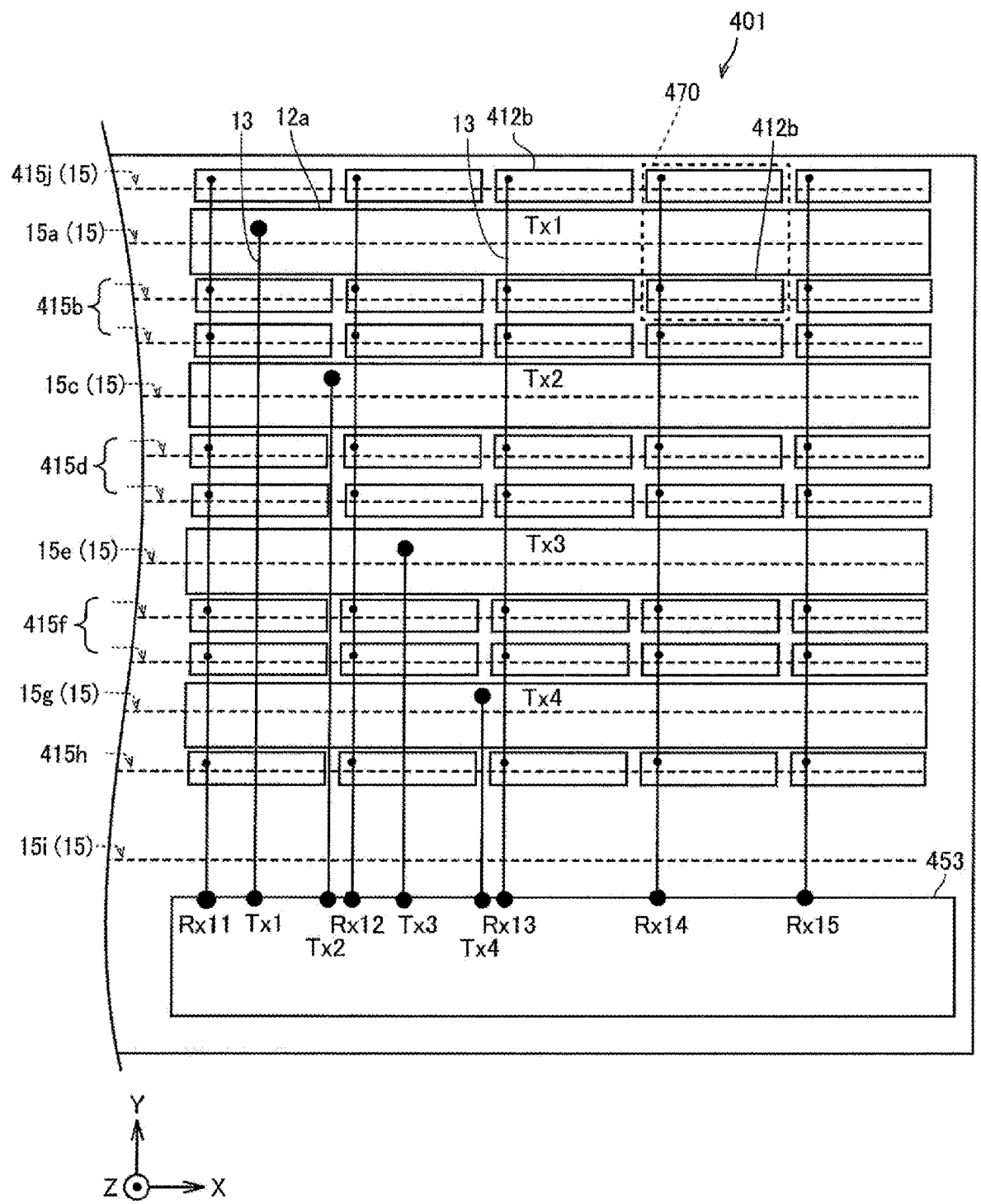
FIG. 17 is a plan view schematically illustrating a configuration of drive electrodes and detection electrodes according to the fourth embodiment.

FIG. 16 is a diagram schematically illustrating a configuration of the unit cell 470 of the display device 400 according to the fourth embodiment. FIG. 17 is a diagram for explaining an arrangement relationship between the drive electrode 412*a* and the detection electrode 412*b* in the touch panel 401 according to the fourth embodiment. As illustrated in FIG. 17, the unit cell 470 includes a portion of the drive electrode 412*a* (Tx), and two detection electrodes 412*b* (Rx). That is, the number of the unit cells 470 is a number equivalent to one-half of the number of the detection electrodes 412*b*. Further, as illustrated in FIG. 16, the unit cell 470 is configured in a rectangular shape in a plan view. Further, in a plan view, the two detection electrodes 412*b* (Rx) are each formed into a rectangular shape. Then, the two detection electrodes 412*b* (Rx) are each disposed on one side and the other side of the Tx in the Y direction. According to this configuration, a boundary between the Rxs having rectangular shapes is formed in the direction (X direction) in which the gate lines 15 extend or the Y direction, making it possible to easily form the Rxs on the active matrix substrate 10 since there is no need to cross the boundary in the X direction or the Y direction. Further, because two Rxs are disposed on both sides of the Tx in the Y direction, the balance from the Tx in both directions of the Y direction is favorable compared to a case in which the Rx is disposed in the Y direction of the Tx, making it possible to improve the accuracy of touch detection. Further, a sum of areas S21 and S22 of the two Rxs is equal to the area S1 of the portion of the Tx constituting the unit cell 470.

Further, as illustrated in FIG. 17, the plurality of Rx11 to Rx15 respectively overlap gate line groups 415*j*, 415*b*, 415*d*, 415*f*, and 415*h* from the upper side in FIG. 17 in a plan view. Note that the other configurations of the display device 400 according to the fourth embodiment are the same as the configurations of the display device 100 according to the first embodiment.

Method for Controlling Display Device According to Fourth Embodiment

Figure 18:
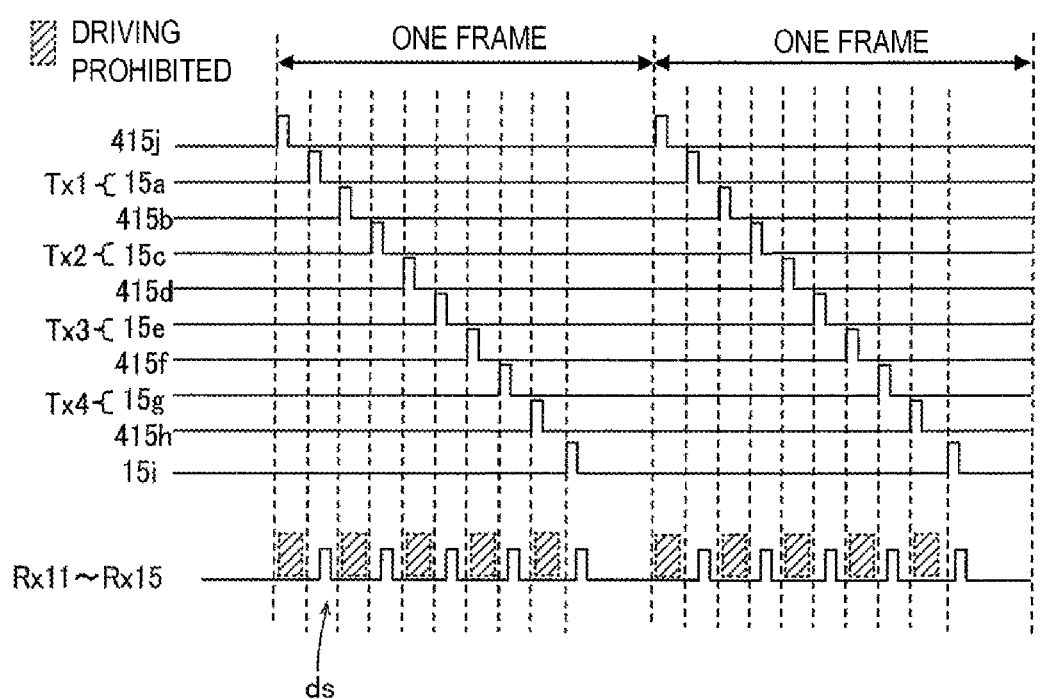
FIG. 18 is a timing diagram related to self-capacitance type touch detection of the display device according to the fourth embodiment.

Next, a method for controlling the display device 400 according to the fourth embodiment will be described with reference to FIG. 18. FIG. 18 is a timing chart for explaining a timing of transmission of the gate signal and the drive signal ds according to the fourth embodiment. Note that the timing of transmission of the drive signal dm by the display device 400 according to the fourth embodiment (configuration related to mutual-capacitance type touch detection) is the same as that of the first embodiment, and thus description thereof will be omitted.

Self-Capacitance Type Touch Detection

As illustrated in FIG. 18, the gate signal is sequentially supplied to the gate line groups 415*j*, 15*a*, 415*b*, 15*c*, 415*d*, 15*e*, 415*f*, 15*g*, 415*h*, and 15*i* within a period of one frame. Then, the drive signal ds is not supplied to Tx1 to Tx4 and the drive signal ds is supplied to Rx11 to Rx15 during a period in which the gate signal is supplied to any of the gate line groups 15*a*, 15*c*, 15*e*, and 15*g* overlapping any of Tx1 to Tx4 in a plan view. Thus, in the fourth embodiment as well, touch detection and display can be implemented in parallel while preventing the effects of touch detection (drive signal ds) on display and the effects of display (gate signal) on touch detection. Note that the other effects of the fourth embodiment are the same as the effects of the first embodiment. Further, in the method for controlling the display device 400 according to the fourth embodiment, self-capacitance type touch detection by Tx1 to Tx4 may be performed as in the method for control of the second or third embodiment described above.

MODIFICATIONS AND THE LIKE

The above-described embodiments are merely examples for carrying out the disclosure. Accordingly, the disclosure is not limited to the embodiments described above and can be implemented by modifying the embodiments described above as appropriate without departing from the scope of the disclosure.

(1) Although, in the first to fourth embodiments described above, an example has been illustrated in which the drive signal ds is supplied to all of Rx1 to Rx10 (Rx11 to Rx15) while the gate signal is being supplied to the gate lines 15 overlapping any one of the plurality of drive electrodes 12*a*, the disclosure is not limited thereto. That is, the drive signal ds may be supplied to a portion of Rx1 to Rx10 (Rx11 to Rx15).

(2) Although, in the second and third embodiments described above, an example has been illustrated in which the drive signal ds is supplied to all of Tx1 to Tx4 while the gate signal is being supplied to the gate lines 15 overlapping any one of the plurality of detection electrodes 12*b*, the disclosure is not limited thereto. That is, the drive signal ds may be supplied to a portion of Tx1 to Tx4.

(3) Although, in the first to fourth embodiments described above, an example has been illustrated in which one drive electrode 12*a* extends in the X direction at a length equivalent to 10 detection electrodes 12*b* (412*b*), the disclosure is not limited thereto. For example, the drive electrodes may be disposed side by side in the X direction, similar to the detection electrode 12*b* (412*b*). In this case, the drive electrodes disposed side by side in the X direction are preferably electrically connected.

(4) Although, in the first to fourth embodiments described above, an example has been illustrated in which any one of the plurality of source lines 18 and the touch signal line 13 overlap in a plan view, the disclosure is not limited thereto. That is, the plurality of source lines 18 and the touch signal line 13 may be disposed at positions not overlapping in a plan view.

(5) Although, in the first to fourth embodiments described above, an example has been illustrated in which the drive electrode 12*a* and the detection electrode 12*b* (412*b*) are each formed into a rectangular shape in a plan view, the disclosure is not limited thereto. For example, the drive electrode 12*a* and the detection electrode 12*b* (412*b*) may each be formed into a diamond shape in a plan view.

The display device with a built-in touch panel and the method for controlling a display device with a built-in touch panel described above can be described as follows.

A display device with a built-in touch panel according to a first configuration is a display device with a built-in touch panel, the display device including a plurality of thin film transistors, a plurality of gate lines connected to the plurality of thin film transistors, extending in a first direction, and disposed side by side in a second direction orthogonal to the first direction, a gate drive controller configured to sequentially supply a gate signal to the plurality of gate lines, a plurality of drive electrodes disposed side by side in the second direction, a plurality of detection electrodes disposed alternately with the plurality of drive electrodes in the second direction and forming an electrostatic capacitance with the plurality of drive electrodes, a mutual capacitance acquisition unit configured to supply a drive signal for mutual capacitance detection to the plurality of drive electrodes and acquire a mutual capacitance detection signal from the plurality of detection electrodes, and a self-capacitance acquisition unit configured to supply a drive signal for self-capacitance detection to the plurality of detection electrodes and acquire a self-capacitance detection signal from the plurality of detection electrodes. Each of the plurality of drive electrodes and the plurality of detection electrodes overlaps at least one of the plurality of gate lines in a plan view, and the self-capacitance acquisition unit is configured to supply the drive signal for self-capacitance detection to at least one of the plurality of detection electrodes while the gate signal is being supplied to gate lines of the plurality of gate lines overlapping any one of the plurality of drive electrodes. (First configuration)

According to the first configuration described above, while the gate signal is being supplied to the gate lines overlapping any one of the plurality of drive electrodes (period in which an image is displayed), the drive signal for self-capacitance detection is supplied to at least one of the plurality of detection electrodes not overlapping the gate lines and having a low possibility of affecting display, and not to the drive electrodes having a possibility of affecting display. Therefore, touch detection and display can be implemented in parallel while preventing the effects of touch detection (drive signal for self-capacitance detection) on display and the effects of display (gate signal) on touch detection. As a result, the driving of the touch panel can be increased in speed. Then, the gate signal can be supplied to a larger number of gate lines per frame, making it possible to increase the number of gate lines and pixel electrodes and thus make the panel (display panel) higher in definition.

In the first configuration, the self-capacitance acquisition unit may be configured to supply the drive signal for self-capacitance detection to the plurality of detection electrodes while the gate signal is being supplied to gate lines of the plurality of gate lines overlapping any one of the plurality of drive electrodes. (Second configuration)

According to the second configuration described above, while the gate signal is being supplied (period in which display is performed), the drive signal for self-capacitance detection is supplied not only to one detection electrode, but to the plurality of detection electrodes, making it possible to further increase the speed of the driving of the touch panel.

In the first or second configuration, the mutual capacitance acquisition unit may be configured to, while the gate signal is being supplied to gate lines of the plurality of gate lines overlapping any one of the plurality of drive electrodes, supply the drive signal for mutual capacitance detection to the other drive electrodes of the plurality of drive electrodes. (Third configuration)

According to the third configuration described above, even when mutual-capacitance type touch detection is performed, the effects of touch detection on display and the effects of display on touch detection can be prevented.

In any one of the first to third configurations, the self-capacitance acquisition unit may be configured to, while the gate signal is being supplied to gate lines of the plurality of gate lines overlapping any one of the plurality of drive electrodes, supply the drive signal for self-capacitance detection to the other drive electrodes of the plurality of drive electrodes. (Fourth configuration)

According to the fourth configuration described above, the drive signal for self-capacitance detection is supplied to the drive electrodes other than the drive electrodes overlapping the gate lines to which the gate signal is being supplied. As a result, even in a case in which self-capacitance type touch detection is performed by using not only the plurality of detection electrodes, but also the plurality of drive electrodes, the effects of touch detection on display and the effects of display on touch detection can be prevented.

In any one of the first to fourth configurations, the self-capacitance acquisition unit may be configured to supply the drive signal for self-capacitance detection to any one of the plurality of drive electrodes while the gate signal is being supplied to gate lines of the plurality of gate lines overlapping any one of the plurality of detection electrodes. (Fifth configuration)

According to the fifth configuration described above, the drive signal for self-capacitance detection is supplied to the drive electrode while the gate signal is being supplied to the gate lines overlapping the detection electrode and not the drive electrode. As a result, even in a case in which self-capacitance type touch detection is performed by using not only the plurality of detection electrodes, but also the plurality of drive electrodes, the effects of touch detection on display and the effects of display on touch detection can be prevented.

In any one of the first to fifth configurations, the plurality of drive electrodes and the plurality of detection electrodes may constitute a plurality of unit cells, and the plurality of unit cells may each include a drive electrode, and a detection electrode having a rectangular shape and provided on both sides of the drive electrode in the second direction in a plan view. (Sixth configuration)

According to the sixth configuration described above, a boundary between the detection electrodes having rectangular shapes is formed in the first direction (direction in which the gate lines extend) or the second direction (direction in which the source lines extend), making it possible to easily form the detection electrodes on the substrate since there is no need to cross the boundaries in the first direction and the second direction. Further, because two detection electrodes are disposed on both sides of the drive electrode in the second direction, the balance in the second direction is favorable compared to a case in which the detection electrode is disposed on one side of the drive electrode in the second direction, making it possible to improve the accuracy of touch detection.

A method for controlling a display device with a built-in touch panel according to a seventh configuration is a method for controlling a display device with a built-in touch panel including a plurality of thin film transistors, a plurality of gate lines connected to the plurality of thin film transistors, extending in a first direction, and disposed side by side in a second direction orthogonal to the first direction, a plurality of drive electrodes disposed side by side in the second direction, and a plurality of detection electrodes disposed alternately with the plurality of drive electrodes in the second direction and forming an electrostatic capacitance with the plurality of drive electrodes, each of the plurality of drive electrodes and the plurality of detection electrodes overlapping at least one of the plurality of gate lines in a plan view. The method includes sequentially supplying a gate signal to the plurality of gate lines, supplying a drive signal for mutual capacitance detection to the plurality of drive electrodes, acquiring a mutual capacitance detection signal from the plurality of detection electrodes, supplying a drive signal for self-capacitance detection to the plurality of detection electrodes, and acquiring a self-capacitance detection signal from the plurality of detection electrodes. The supplying of the drive signal for self-capacitance detection includes supplying the drive signal for self-capacitance detection to at least one of the plurality of detection electrodes while the gate signal is being supplied to gate lines of the plurality of gate lines overlapping any one of the plurality of drive electrodes. (Seventh configuration)

According to the seventh configuration described above, similar to the first configuration described above, the panel can be made higher in definition and the driving can be increased in speed while preventing the effects of touch detection on display and the effects of display on touch detection.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A display device with a built-in touch panel, the display device comprising:
   a plurality of thin film transistors;
   a plurality of gate lines connected to the plurality of thin film transistors, extending in a first direction, and disposed side by side in a second direction orthogonal to the first direction;
   a gate drive circuit configured to sequentially supply a gate signal to the plurality of gate lines;
   a plurality of touch drive electrodes disposed side by side in the second direction;
   a plurality of detection electrodes disposed alternately with the plurality of touch drive electrodes in the second direction and forming an electrostatic capacitance with the plurality of touch drive electrodes;
   a mutual capacitance acquisition circuit configured to supply a touch drive signal for mutual capacitance detection to the plurality of touch drive electrodes and acquire a mutual capacitance detection signal from the plurality of detection electrodes; and
   a self-capacitance acquisition circuit configured to supply a touch drive signal for self-capacitance detection to the plurality of detection electrodes and acquire a self-capacitance detection signal from the plurality of detection electrodes,
   wherein each of the plurality of touch drive electrodes and the plurality of detection electrodes overlaps at least one of the plurality of gate lines in a plan view, and
   the self-capacitance acquisition circuit is configured to supply the touch drive signal for self-capacitance detection to at least one of the plurality of detection electrodes while the gate signal is being supplied to gate lines of the plurality of gate lines overlapping any one of the plurality of touch drive electrodes, wherein the mutual capacitance acquisition circuit is configured to, while the gate signal is being supplied to gate lines of the plurality of gate lines overlapping any one of the plurality of touch drive electrodes, execute a first supply process to supply the touch drive signal for mutual capacitance detection to other touch drive electrode of the plurality of touch drive electrodes, and the mutual capacitance acquisition circuit is configured to, while the gate signal is being supplied to gate lines of the plurality of gate lines overlapping any one of the plurality of detection electrodes, execute a second supply process to supply the touch drive signal for mutual capacitance detection to the other touch drive electrode before executing the first supply process.

2. The display device with a built-in touch panel according to claim 1, wherein the self-capacitance acquisition circuit is configured to, while the gate signal is being supplied to gate lines of the plurality of gate lines overlapping any one of the plurality of touch drive electrodes, supply the touch drive signal for self-capacitance detection to the plurality of detection electrodes.

3. The display device with a built-in touch panel according to claim 1, wherein the self-capacitance acquisition circuit is configured to, while the gate signal is being supplied to gate lines of the plurality of gate lines overlapping any one of the plurality of touch drive electrodes, supply the touch drive signal for self-capacitance detection to the other touch drive electrodes of the plurality of touch drive electrodes.

4. The display device with a built-in touch panel according to claim 1, wherein the self-capacitance acquisition circuit is configured to, while the gate signal is being supplied to gate lines of the plurality of gate lines overlapping any one of the plurality of detection electrodes, supply the touch drive signal for self-capacitance detection to any one of the plurality of touch drive electrodes.

5. The display device with a built-in touch panel according to claim 1, wherein the plurality of touch drive electrodes and the plurality of detection electrodes constitute a plurality of unit cells, and the plurality of unit cells each includes a touch drive electrode, and a detection electrode having a rectangular shape and provided on both sides of the touch drive electrode in the second direction in a plan view.

6. The display device with a built-in touch panel according to claim 1, further comprising:

a touch detection circuit that performs alternately a self-capacitance type touch detection by the self-capacitance acquisition circuit and a mutual-capacitance type touch detection by the mutual capacitance acquisition circuit.

7. A method for controlling a display device with a built-in touch panel, the display device including a plurality of thin film transistors, a plurality of gate lines connected to the plurality of thin film transistors, extending in a first direction, and disposed side by side in a second direction orthogonal to the first direction, a plurality of touch drive electrodes disposed side by side in the second direction, and a plurality of detection electrodes disposed alternately with the plurality of touch drive electrodes in the second direction and forming an electrostatic capacitance with the plurality of touch drive electrodes, each of the plurality of touch drive electrodes and the plurality of detection electrodes overlapping at least one of the plurality of gate lines in a plan view, the method comprising:

sequentially supplying a gate signal to the plurality of gate lines;

supplying a touch drive signal for mutual capacitance detection to the plurality of touch drive electrodes acquiring a mutual capacitance detection signal from the plurality of detection electrodes;

supplying a touch drive signal for self-capacitance detection to the plurality of detection electrodes; and acquiring a self-capacitance detection signal from the plurality of detection electrodes, wherein the supplying of the touch drive signal for self-capacitance detection includes supplying the touch drive signal for self-capacitance detection to at least one of the plurality of detection electrodes while the gate signal is being supplied to gate lines of the plurality of gate lines overlapping any one of the plurality of touch drive electrodes, the supplying the touch drive signal for mutual capacitance detection includes executing a first supply process, while the gate signal is being supplied to gate lines of the plurality of gate lines overlapping any one of the plurality of touch drive electrodes, to supply the touch drive signal for mutual capacitance detection to other touch drive electrode of the plurality of touch drive electrodes, and the supplying the touch drive signal for mutual capacitance detection includes executing a second supply process, while the gate signal is being supplied to gate lines of the plurality of gate lines overlapping any one of the plurality of detection electrodes, to supply the touch drive signal for mutual capacitance detection to the other touch drive electrode before executing the first supply process.

8. The method for controlling the display device with a built-in touch panel according to claim 7, further comprising:

performing alternately a self-capacitance type touch detection and a mutual-capacitance type touch detection, wherein the self-capacitance type touch detection includes the supplying of the touch drive signal for self-capacitance detection to the plurality of detection electrodes and the acquiring of the self-capacitance detection signal from the plurality of detection electrodes, and the mutual-capacitance type touch detection includes the supplying of the touch drive signal for mutual capacitance detection to the plurality of detection electrodes and the acquiring of the mutual capacitance detection signal from the plurality of detection electrodes.

* * * * *